United States Patent [19]

Bruno

[11] Patent Number: 5,415,815
[45] Date of Patent: May 16, 1995

[54] FILM FOR GLARE REDUCTION

[76] Inventor: Art Bruno, 1853 Pebble Beach Cir., Elk Grove Village, Ill. 60007

[21] Appl. No.: 91,197

[22] Filed: Jul. 14, 1993

[51] Int. Cl.⁶ .......................... F21V 9/00; B05D 5/06; H01J 31/00
[52] U.S. Cl. .................... 252/582; 252/305; 427/64; 427/68; 313/479; 313/480
[58] Field of Search ............... 313/479, 480; 427/64, 427/68; 252/582, 589, 305

[56] References Cited

U.S. PATENT DOCUMENTS

| | | | |
|---|---|---|---|
| 3,679,451 | 7/1972 | Marks et al. | 313/479 |
| 4,431,763 | 2/1984 | Reed | 524/389 |
| 4,551,356 | 11/1985 | Heiz | 427/64 |
| 4,604,297 | 8/1986 | Liu | 427/64 |
| 4,734,295 | 3/1988 | Liu | 427/64 |
| 4,755,716 | 7/1988 | Hayafune et al. | 313/479 |
| 4,765,729 | 8/1988 | Taniguchi | 427/64 |
| 4,806,583 | 2/1989 | Battaglia | 427/64 |
| 4,943,862 | 7/1990 | Vesaka et al. | 313/479 |
| 5,104,692 | 4/1992 | Belmares | 427/164 |
| 5,308,389 | 5/1994 | Russo et al. | 252/305 |

*Primary Examiner*—Philip Tucker
*Attorney, Agent, or Firm*—Basil E. Demeur; Alan B. Samlan

[57] ABSTRACT

There is disclosed a film composition useful for reducing light glare especially adapted for use in connection with cathode-ray tube or other monitor screens which is formed from a colloidal suspension from between ten percent to thirty percent by weight of an aliphatic thermoplastic urethane resin dissolved in a blend of water, N-methylpyrrolidone and amines, mixed with between seventy percent and ninety percent by weight of Denatured Ethyl Alcohol (190 proof). The colloidal suspension is admixed with an aerosol propellant under pressure, and is deposited on a monitor screen by aerosol deposition to create a film having a thickness of between 0.5 mil and 2 mil. The deposited film dries immediately, and functions to dramatically reduce the glare of light reflecting from the screen monitor.

7 Claims, No Drawings

FILM FOR GLARE REDUCTION

BACKGROUND OF THE INVENTION

The present invention relates to a film useful for glare control, especially useful in connection with cathoderay tubes, or other monitor screens of the type presently used in connection with computers.

With the advent of computers, and especially in connection with the extensive use of computers, one of the problems that has arisen in connection with the use of computers is the amount of reflected light that emanates from the computer screen. This has become an especially troublesome problem for those persons who are obligated to use computers in connection with their daily work process, especially when such persons are in front of a computer screen for several hours per day. It has been found that the reflected light which comes from the computer screen, in addition to the glare of the image on the screen, causes eye strain and other related problems detrimental to the health of the persons utilizing the computer.

For this reason, the art has been replete with various attempted developments to either cover the computer screen, or to apply some type of a coating to the screen which would have the effect of reducing the glare especially of reflected light.

The prior art has developed such items as plastic screen overlays which were employed for overlying a monitor screen, but usually have the effect of darkening the image or picture emanating from the computer screen. Such screens were believed to reduce the eye strain on the user by softening the image or picture from the screen mainly by having the effect of cutting the brilliance of the light waves and basically darkening the screen. However, in most instances, such screen overlays were made of plastic, and in and of themselves, also reflected light. This was especially apparent in rooms which were lit with neon-fluorescent lighting, the light waves emanating from the fluorescent lighting further reflecting off the plasticized screen which was used as an overlay on the computer monitor screen.

Various attempts were then made in the prior art to develop coatings of various types which could be applied to the screen of the computer, and would have the effect of either diffracting, or reflecting light away from the eyes of the user. For example, U.S. Pat. No. 4,734,295 was directed to a glare control composition and a method of applying the same. The teaching of this patent was to provide a glare-controlling coating with a reflective, transmissive surface which consisted of a liquid dispersion comprising an organic polymeric particles and a flattening agent. The organic polymer was selected from the group of dispersion containing latices, varnishes, polyurethane dispersions, lacquers, coreactable systems or condensing systems. The flattening agent was selected from either a magnesium carbonate, cellite, alumina hydrate, wax, aluminum stearate, zinc tungate, silica, and zinc stearate. The patent teaches that a composition formed in this manner when applied to a glass or plasticized transmissive surface, created a coating which functioned at least in part to prevent reflective light from such surface. Indeed, the patent teaches the use of providing a second coating on the screen, the second coating being an inert fluid coating having the effect of controlling the degree of the anti-glare effect and enhancement of contrast.

It is clear that any such coating applied to a monitor screen must in itself be light transmissive or clear, such that the images appearing on the screen would still be visible to the user. The object of the coating would be to either deflect light away from the eyes of the user, or to absorb light such that the light would not be reflected back to the eyes of the viewer.

Various other patents illustrate still other types of compositions employed as a coating. For example, U.S. Pat. No. 4,604,297 discloses a transmission enhancing coating which consists of a polyvinyl acetate particulates and water or an acrylic resin and an aqueous dispersion of polyvinyl acetate. The patent teaches that such a coating would have the effect of preventing reflection from the glass type screen surface in order to prevent strain to the eyes of the viewer.

Still another prior art patent, namely U.S. Pat. No. 4,765,729 discloses the provision of an anti-reflection optical article which comprises a substrate consisting of a single-layer or multi-layer anti-reflection film having a surface film composed of an inorganic substance formed onto the substrate, and a coating of an organic substance containing a curing material formed on the surface of the anti-reflection film. The basic ingredient of the composition is a silicon dioxide or other silica containing materials. However, the method of the subject patent appears to require multi-layers of coating in order to operate properly as an anti-reflection multi-layer film.

Still another more recent patent which discloses an anti-reflective coating for use in connection with such substrate is U.S. Pat. No. 5,104,692. This patent teaches the use of a first bottom layer containing less than ten percent by weight of a titanium dioxide, and a titanium-free top layer which contains polysiloxane. Hence, the teaching of the subject patent requires a two-layer film composition in order to accomplish its anti-reflective characteristic. Similarly, various other patents disclose other types of coatings formed by a variety of compounds, including polyurethane resins.

The present invention is intended as an improvement with regard to such prior art patents in that the present invention only requires a single coating forming a film over the monitor screen and functions particularly well as an anti-reflective coating. The present invention further provides a coating which permits ease of removal since the coating, once dried on the monitor screen may easily be removed by a common household solvent. Hence, the user is able to prevent coating build-up so that if the coating should fail with age and time, the user may easily remove the coating, and apply a fresh anti-glare coating onto the monitor screen.

OBJECTS AND ADVANTAGES

It is therefore the principal object of the present invention to provide an improved coating composition for coating cathode-ray tubes, and specifically monitor screens such as television screens, computer screens and the like.

In conjunction with the foregoing object, it is a further object of the present invention to provide an anti-glare coating composition which is formed by a colloidal suspension consisting of from ten to thirty percent by weight of an aliphatic thermoplastic urethane resin dissolved in a blend of water, N-methylpyrrolidone and amines, which is in turn mixed with between seventy percent and ninety percent by weight of Denatured Ethyl Alcohol (190 proof). The composition is then admixed with an aerosol propellant under pressure, and may then be deposited on a monitor screen by aerosol deposition. The resulting coating is gaged to have a resulting thickness of between 0.5 mil and 2 mil in thickness.

Another object of the present invention, in conjunction with the foregoing objects, is to provide an anti-glare composition of the type described, wherein the film composition is formed by an aliphatic thermoplastic polyurethane resin solution which comprises a solution of about thirty percent by weight of an aliphatic thermoplastic polyurethane polymer dissolved in a blend of seventy-five percent water, of twenty-three percent N-methylpyrrolidone and two percent amines.

In conjunction with the foregoing object, the solution of an aliphatic thermoplastic polyurethane polymer dissolved in a blend of water, N-methylpyrrolidone and amines is further admixed with Denatured Ethyl Alcohol (190 proof) in a ratio from about ten percent to thirty percent by weight of the resin solution, to between seventy percent and ninety percent by weight of the Denatured Ethyl Alcohol (190 proof). The colloidal suspension so formed is then admixed with an aerosol propellant under pressure such that the colloidal suspension may be deposited onto a monitor screen by aerosol application.

In conjunction with the foregoing objects, a further object of the present invention is to provide a composition of the type described wherein the film composition of the present invention is fully dissolvable and is fully removable by the application of an ammonia solution.

SUMMARY OF THE INVENTION

In summary, the present invention is intended to provide an improved film composition useful as a light glare-reducing film for cathode-ray tubes and other monitor screens such as television screens, computer screens, and other screen monitors, which permits ease of application by means of aerosol deposition. The film of composition of the present invention is formed by a colloidal suspension of from between ten percent to about thirty percent by weight of an aliphatic thermoplastic polyurethane resin dissolved in a blend of water, N-methylpyrrolidone and amines, which is in turn mixed with from between seventy percent and ninety percent by weight of Denatured Ethyl Alcohol (190 proof). The composition so formed is a colloidal suspension. The colloidal suspension so formed is then admixed with an aerosol propellant under pressure, such that the colloidal suspension may be deposited on the monitor screen by means of aerosol deposition.

The preferred thickness of the deposited film should be between 0.5 mil and 2 mil which is achieved by means of properly spraying the composition onto the screen monitor.

The present invention further is an improvement in that the film composition so deposited on the monitor screen as indicated will dry immediately upon contact, thereby permitting the user to quickly apply the film composition in a single procedure.

A further feature of the present invention is the ability to remove the film by the use of simple household dissolvents, such as a window cleaner which contains a solution of ammonia. The film will be easily dissolved by spraying a window cleaner onto the screen surface, thereby softening and dissolving the film which may then be wiped clean. The cleaned screen monitor surface may then be recoated with a film composition in accordance with the present invention in order to maintain the effective glare-reducing capabilities of the subject film composition.

DETAILED DESCRIPTION OF INVENTION

The present invention is intended to provide a film composition suitable for aerosol deposition onto a cathoderay tube, or other similar type monitor screen, such as for example, television screens, computer screens and other such monitor screens. In the typical application, the screen is made either of a glass or a plastic substrate material, and provides a display screen for the display of discrete images or information. The images, as is well-known, are created by light, and intended for transmission to the eyes of the viewer. It has been noted, however, for a considerable period of time, that the screens in and of themselves are light reflective, and therefore, light from the room in which the particular equipment is being employed by the user often reflects light from the screen into the eyes of the viewer. The result of this condition is that the user of the equipment often develops eye strain or other maladies associated with long and continuous use of the equipment. This is especially prevalent in connection with users that employ computer screens for long periods of time during a typical work day.

Quite surprisingly, the present invention has determined that the use of a material which was previously intended as a coating, primarily for wood finishes, such as a urethane polymer, when formulated into the proper composition, may be adequately incorporated into an aerosol spray container, and deposited by aerosol deposition onto the screen and will function quite efficiently as a light glare-reducing film. The result is surprising in that the polyurethanes employed in the present composition are typically employed as a wood varnish, and have the tendency to have a very high gloss finish and hence, tend to be extremely light reflective in their usual application on wood or other similar surfaces. The present invention has determined, however, that when the appropriate composition is diluted with Denatured Ethyl Alcohol (190 proof), in the proper proportions, a colloidal suspension is created, which when applied at the proper thickness to a monitor screen, will have a glare-reducing characteristic.

In accordance with the present invention, it has been found that the use of a water dispersible, fully reacted, aliphatic, thermoplastic polyurethane resin which is dispersed in a blend of water, N-methylpyrrolidone and amines, is suitable for the present invention. A polyurethane resin so dissolved in a blend of water, N-methylpyrrolidone and amines, is further thinned down or suspended in Denatured Ethyl Alcohol (190 proof) as the solvent, in certain proportions. The resulting colloidal suspension in Denatured Ethyl Alcohol (190 proof) is then admixed with an aerosol propellant, under pressure in an appropriate aerosol container. The colloidal suspension may then be deposited onto the monitor screen by means of aerosol deposition and when done so in the proper manner, will result in a film having a thickness of between 0.5 mil and 2 mil in thickness, and will effectively reduce the glare associated with the reflective light off of the monitor screen.

It has been found in connection with the present invention that a polyurethane resin which is actually an aliphatic thermoplastic polyurethane resin is dissolved in a blend of water, N-methylpyrrolidone and amines. The ratio consists of approximately thirty percent by weight of the polyurethane resin polymer, in approximately seventy percent of the blend of water, N-methylpyrrolidone and amines. The blend so identified is actually a blend of seventy-five percent water, twenty-three percent N-methylpyrrolidone and two percent amines, said percentages being by weight. It has been determined that the solution so formed is then employed to create a colloidal suspension in Denatured Ethyl Alcohol (190 proof). More specifically, an amount of approximately thirty percent by weight of the solution of polyurethane polymer resin as dissolved in water, N-methylpyrrolidone and amines, is admixed with approximately seventy percent by weight of Denatured Ethyl Alcohol (190 proof). This mixture actually forms a colloidal suspension of the polyurethane resin solution in the Denatured Ethyl Alcohol (190 proof), and in this format, may be admixed with an appropriate aerosol propellant.

It has been determined in accordance with the present invention that the percentages, while being variable, must be present in a range of between ten percent and thirty percent by weight of the polyurethane polymer resin in water, N-methylpyrrolidone and amines, and between about seventy percent and ninety percent by weight of Denatured Ethyl Alcohol (190 proof). If the polyurethane polymer resin is present in excessive amounts, it has been found that the resulting suspension will be overly solid-containing, and will not form a proper suspension such that when applied to a screen, will have a tendency to have a greater degree of mass then can operate efficiently as a glare-reducing composition. Hence, it is important that the polyurethane resin polymer be present in an amount of not exceeding thirty percent in the colloidal suspension.

It has similarly been determined that if an excessive amount of Denatured Ethyl Alcohol (190 proof) is employed such that the polyurethane resin has been overly diluted, a proper film composition cannot be achieved. It has therefore been determined that a ratio of between ten and thirty percent by weight of the polyurethane resin as dissolved in water, N-methylpyrrolidone and amines, would be suspended in an amount of between seventy percent and ninety percent by weight of Denatured Ethyl Alcohol (190 proof).

Once so admixed, that is the polyurethane resin polymer in Denatured Ethyl Alcohol (190 proof), the suspension is thoroughly mixed in a mechanical mixer, afterwhich, the resulting colloidal suspension is combined or admixed with the aerosol propellant again in the proper proportion. It has been found that the colloidal suspension should be present in a ratio of approximately two to one with respect to the aerosol propellant. Hence, if one is intending to create a six ounce aerosol can as the vehicle for the composition deposition, one would employ approximately four ounces net weight of the colloidal suspension to approximately two ounces of the aerosol propellant for a total of six ounces of material in the container. Hence, a ratio of approximately two to one, colloidal suspension to aerosol propellant has been found to function efficiently for purposes of the present invention.

It has further been found that the composition of the present invention requires the proper aerosol propellant in order to operate efficiently as a glare-reducing film composition. It is believed that the requirement is that the colloidal suspension be deposited by aerosol deposition and dry immediately upon contact with the underlying substrate surface. In accordance with the present invention, dimethyl ether has been found to be the aerosol propellant which will function most efficiently with the colloidal suspension as formed in accordance with the present invention. It is believed that dimethyl ether functions in that it is the only propellant that will air dry immediately upon contact with the underlying surface. Once the aerosol mixture has been prepared, and properly packaged in an aerosol can, such as a six ounce aerosol can, for example, the method of application requires that the user properly apply the colloidal suspension in order to create the proper film composition on the screen. It is recommended and has been founded that by maintaining the spray tip of the can approximately eight inches from the screen, and maintaining this distance during the entire aerosol deposition process, an even and uniform thickness of film will be deposited on the screen. It has been found that at a distance of approximately eight inches, an area of approximately one and a half inches of screen substrate will be covered with each pass by the user. It has also been determined that a proper application would indicate that the user should apply the aerosol in a horizontal path, moving from either left to right or right to left. With each pass, the user would drop the tip of the aerosol can down approximately an inch and a half, and move in the opposite direction along the horizontal path. The user should continue depositing the film in this manner until the entire screen has been completed.

It has been found that by using dimethyl ether as the aerosol propellant, the film is virtually dry on contact. However, it has further been determined that if the user permits the position to set for approximately three hours, this will ensure that the film has properly dried and cured. The process might be hastened if the user wishes to apply heat to the coated screen for a few minutes of time which will aid in the curing process. Furthermore, once the film has been deposited onto the monitor screen, it is best that the film be allowed to cure and set without touching or otherwise physically interfering with the curing process. Hence, while the coating may be dry, as indicated, proper drying and curing is indicated for a period of time after application.

Furthermore, it has been found that a proper thickness is desirable in order to enhance the glare-reducing characteristics of the film. Film thickness between 0.5 mil and 2 mil has been found to be the preferred range of film thickness, since a film which is not sufficiently thick will begin to fail to have glare-reducing characteristics, and a film which is overly thick may in fact have reflective characteristics which are undesirable. It has been found that the method of depositing the film as indicated above will in fact result in a film composition thickness of between 0.5 mil and 2 mil when so properly applied.

In accordance with the above description, it will be noted that the present invention provides an effective film composition for coating a cathode-ray tube, or other monitor screens such as a television screen, computer screen or the like, in order to provide a glare-reducing coating for such screens. The present invention permits the film composition to be incorporated in an aerosol container which may therefore be deposited by aerosol deposition. This, therefore, eliminates the need for any mechanical type screens or overlays, and also simplifies the coating process in that a single coating is applied by means of aerosol deposition thereby eliminating the need for multiple coating layers as indicated in the prior art.

Further, it has been found that the coating, once applied to a monitor screen in accordance with the presence invention, is fully dissolvable by ordinary household solvents such as window cleaners or other such compositions containing ammonia. Hence, should the user desire to clean the screen and remove the coating in order to fully clean the equipment, the use of a window cleaner such as the type typically found in any household may be utilized. The window cleaner is simply applied to the screen by spray deposition, which will soften and/or commence the dissolution of the film material, and the composition may be removed by wiping the screen after the ammonia containing solvent has been applied. The window cleaner with ammonia will fully remove the film composition permitting the user to then fully clean the screen, afterwich a new coating may be reapplied by the simple use of an aerosol deposition, once again.

While there has been described what is at present considered to be the preferred embodiment of the invention, it will be understood that various modifications and variations may be made therein, and it is intended to cover in the appended claims all such variations and modifications as appear obvious to those skilled in the art.

I claim:

1. A film composition useful as a light glare-reducing film for monitor screens comprising,
   a colloidal suspension consisting of from between ten percent to thirty percent by weight of a solution in water containing an aliphatic thermoplastic polyurethane resin, N-methylpyrrolidone and amines, mixed with between seventy percent and ninety percent by weight of Denatured Ethyl Alcohol,
   said colloidal suspension being admixed with an aerosol propellant under pressure,
   said admixed colloidal suspension deposited onto a monitor screen by aerosol application to form a film having a thickness of between 0.5 mil and 2 mil,
   thereby to create a deposited film on the monitor screen which functions to reduce light glare emanating from the monitor screen during use.

2. The film composition as set forth in claim 1 above, wherein said aliphatic thermoplastic polyurethane resin solution comprises a solution consisting of about thirty percent by weight of said aliphatic thermoplastic polyurethane resin and about seventy percent by weight of a blend of water, and N-methylpyrrolidone and amines.

3. The film composition as set forth in claim 2 above, wherein said colloidal suspension is admixed with di-methyl ether as the propellant in a ratio of about sixty-seven percent by weight colloidal suspension to about thirty-three percent by weight of said propellant.

4. A method of forming a film for reducing light glare for use in connection with a monitor screen such as a cathode-ray tube, comprising the steps of,
   providing a solution of an aliphatic thermoplastic polyurethane resin dissolved in a blend of water, N-methylpyrrolidone and amines,
   suspending said aliphatic thermoplastic polyurethane resin solution in Denatured Ethyl Alcohol in a ratio of between ten percent and thirty percent by weight of said resin solution to from between seventy percent and ninety percent by weight of said Denatured Ethyl Alcohol,
   admixing said colloidal suspension of resin and Denatured Ethyl Alcohol with an aerosol propellant under pressure thereby to create an aerosol spray,
   and depositing said colloidal suspension onto a monitor screen by aerosol deposition to a thickness of between 0.5 mil and 2 mil,
   thereby forming a dry film of said aliphatic thermoplastic polyurethane resin on the monitor screen which functions as a light glare-reducing film.

5. A method of forming a film for reducing light glare as set forth in claim 4 above, wherein said aliphatic thermoplastic polyurethane resin solution is formed by dissolving thirty percent by weight of said resin in a solution blend of about seventy-five percent by weight of water, twenty-three percent by weight of N-methylpyrrolidone and two percent by weight of amines.

6. A method of forming a film for reducing light glare on monitor screens as set forth in claim 4 above, wherein said aerosol propellant comprises di-methyl ether.

7. A method forming a film for reducing light glare on monitor screens as set forth in claim 6 above, wherein said mixture of aliphatic thermoplastic polyurethane resin and di-methyl ether is in the ratio of about sixty-seven percent by weight of said polymer and thirty-three percent by weight of said propellant.

* * * * *